Oct. 22, 1940.   E. R. DETRICK   2,218,745
PAD
Filed April 10, 1939

INVENTOR.
EDWARD R. DETRICK
BY
Whittemore, Hulbert & Belknap
ATTORNEYS

Patented Oct. 22, 1940

2,218,745

UNITED STATES PATENT OFFICE 2,218,745

PAD

Edward R. Detrick, Detroit, Mich., assignor to National Automotive Fibres, Inc., Detroit, Mich., a corporation of Delaware Application April 10, 1939, Serial No. 267,070

2 Claims. (Cl. 155—184)

The present invention relates to a pad, and more particularly to a composite pad adapted to be used intermediate a spring unit and an upholstery material.

The present invention finds a wide field of utility in automotive upholstery, and I have chosen to illustrate my invention in connection with an automobile seat construction. It will be apparent, however, that my invention is capable of many other applications, and accordingly I wish it to be understood that the present drawing and disclosure are illustrative only.

In forming seats and backs in automotive vehicles, it is at the present time conventional practice to provide a spring unit which includes a plurality of coil springs anchored within a frame which ordinarily is generally rectangular in shape. The spring unit has upper and lower boundary members, usually in the form of relatively stiff wires. In order to provide a padded seat construction, it is at the present time conventional practice to provide a so-called insulator which overlies the top of the spring unit. This insulator may take many forms, and one form, for example, is a burlap member interlaced with wires. Over this insulator member a soft pad of fibrous material, such for example as cotton, is laid. This pad is precut to shape and is of a size to extend somewhat beyond the upper boundary wires of the spring unit. In assembling the complete structure, a cover fabric is next placed over the padded material and is drawn tightly down around the sides of the spring unit, being secured to the bottom of the spring unit, or other structure adjacent the bottom of the spring unit, as for example by tacking.

The present invention contemplates the use of a novel pad built up of a sheet of vulcanized rubber which is disposed between the upper and lower surface of a precut pad of loosely integrated fibrous material, such for example as cotton. The sheet of rubber is of high tensile strength and is relatively thin so as to be extremely flexible. It is further characterized by its elasticity or its resiliency. In order to secure the sheet of rubber in place and substantially tensioned over the spring unit, I prefer to provide securing means in the form of strips of strong fabric. These strips of fabric may be vulcanized to the rubber or may be sewed thereto, and if sewed, the sewing may additionally secure the loosely integrated fibrous material to the sheet of rubber. Otherwise I prefer to adhesively unite the strips of rubber to the abutting plies of fibrous material.

It is accordingly an object of the present invention to provide a preformed upholstery pad characterized by a sheet of resilient material.

It is a further object of the present invention to provide a preformed upholstery pad comprising a sheet of vulcanized rubber intermediate two plies of fibrous material.

It is a further object of the present invention to provide an improved seat construction comprising a spring unit, a sheet of resilient material tensioned over the top of the spring unit, and a ply of fibrous padding material overlying the sheet of resilient material.

Other objects of the invention will be apparent as the description proceeds, and when taken in conjunction with the accompanying drawing, wherein Figure 1 is a perspective of a pad embodying the present invention;

Figure 1:
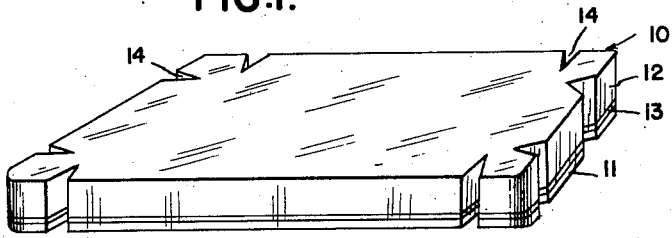

Referring first to Figure 1, the pad illustrated generally at 10 comprises a lowermost ply 11 of loosely integrated padding material, such for example as cotton. An uppermost ply 12 of padding material, which may also be loosely integrated cotton, is provided. Intermediate the plies 11 and 12, I provide a sheet of highly resilient material 13 which preferably is high grade, dense, strong, flexible vulcanized rubber.

The pad 10, illustrated in Figure 1, is intended for use with a spring unit. Preferably the pad 10 is somewhat larger than the upper surface of the spring unit so that its edges may be drawn about the upper boundary wires of the spring unit. For this purpose notches 14 are provided adjacent the corners of the pad to facilitate folding the pad about the corners of the spring unit.

While I have indicated that loosely integrated cotton is a suitable fibrous material to employ, I desire to emphasize the fact that other fibrous material may be employed. Furthermore, the fibrous material employed in the lowermost ply 11 may be of a different nature than the fibrous material employed in the upper ply 12. As will be evident, the upper ply 12 provides a pad substantially directly engaged by a person using the seat, whereas the lowermost ply 11 serves largely to protect the sheet of rubber from the spring unit. It is therefore possible to employ a less expensive fibrous material for the lowermost ply, and for this purpose coarse strong fibers, such for example as jute or sisal may be preferred.

It is further desired to emphasize the fact that the present pad is a unit. In other words, the uppermost and lowermost plies 11 and 12 are secured to the intermediate rubber sheet so that the assembly may be handled as a unit. This facilitates to a considerable extent the upholstery of a motor vehicle. The pad may be placed directly on the spring unit and its edges drawn downwardly about the upper edges of the spring unit. Preferably attaching means are secured directly to the rubber sheet 13. These attaching means take the form of fabric strips 15 which may be secured directly to the rubber sheet 13. I have omitted these strips 15 from Figure 1 for clearness.

Figure 2:
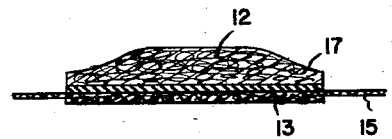
Figure 2 is a section of a pad similar to the pad shown in Figure 1.

In Figure 2, however, I have shown fabric strips 15 as secured directly to the rubber sheet 13. Strips 15 may be secured to the sheets 13 by any convenient means. Thus, for example, in Figure 2 I have illustrated a vulcanized bond between the strips 15 and sheets 13. This bond is of great strength and is for all practical purposes permanent. Instead of vulcanizing the strips 15 to the sheets 13, they may be secured thereto by any suitable cement.

Also illustrated in Figure 2 is the form of the upper ply 12, which, as shown, has material removed from adjacent the edges to provide so-called feathered edges 17. This prevents the appearance of the bulky edge to the pad when in assembled relation.

If desired, the fibrous material may be treated with a suitable adhesive over its surface for facilitating its handling prior to assembly in a motor vehicle. Thus a very thin film of some liquid adhesive, such as latex, may be sprayed over the surfaces of the pad. This, however, is by no means necessary.

Figure 4:
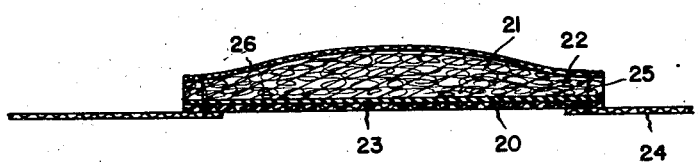
Figure 4 is a transverse section through a pad illustrating a slightly different modification of my invention.

In Figure 4 I have illustrated a modified arrangement in which a lowermost ply of padding material 20 is provided, together with an uppermost ply of padding material 21. The uppermost ply of padding material is provided with a feathered edge, indicated at 22. Intermediate the plies 20 and 21, I provide a rubber sheet 23. In this modification the strips 24 of fabric are attached to the rubber sheet 23 by sewing, indicated generally at 25. As indicated here, the sewing penetrates not only the sheet of rubber 23 and the strip of fabric 24 but also the uppermost and lowermost plies of padding material 21 and 20, respectively.

At this time, attention is directed to the fact that, if desired, the padding material and particularly the upper ply 12, shown in Figures 1 and 2, and the upper ply 21, shown in Figure 4, may be covered with a fabric indicated at 26, which may take the form of an inexpensive sheet material, such as muslin or tobacco cloth.

Figure 3:
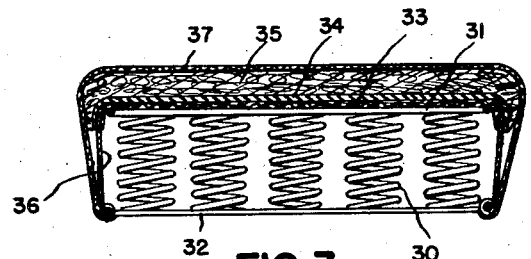
Figure 3 is a vertical section through a seat embodying the present invention.

Referring next to Figure 3, I have illustrated an assembled cushion in which my improved pad is employed. In this figure a spring unit generally indicated at 30 is employed, comprising an upper border wire 31 and a lower border wire 32. A composite pad, as described herein, is applied directly over the top of the spring unit 30. This pad comprises a lowermost ply of padding material 33, an intermediate sheet of rubber 34, and an uppermost ply of loosely integrated padding material 35. If desired the fibrous padding material may be provided with an upper cover of sheeting or it may be sprayed with a suitable adhesive binder as previously indicated.

The pad as previously stated is somewhat larger than the top of the spring unit 30 and may therefore be folded downwardly about the edges of the upper boundary wire 31. In applying the pad to the spring unit 30, the strips of attaching fabric 36 are drawn downwardly strongly to substantially tension the sheet of rubber 34 over the top of the spring unit 30. I have illustrated the fabric 30 as secured to the lower boundary wire 32 as by hog rings, or the like.

After attachment of my improved pad as above described, conventional upholstery fabric as indicated at 37 may be applied thereover and attached in a conventional manner. I have indicated upholstery material 37 as also attached to the lower boundary wire 32, but any well-known means of attaching the same may be employed.

In addition to providing a unitary pad which may be applied as a unit to the spring housing, the herein disclosed construction presents other advantages over the prior art. As previously stated, the pad is applied to the upper surface of the spring unit in a manner such that the sheet of rubber is substantially tensioned. By this means the riding qualities of the cushion are substantially improved. The rubber increases the resiliency and cooperates with the spring unit. Localized pressure is somewhat distributed by the sheet of rubber so as to be resisted by a number of spring coils, and further the resiliency of the rubber sheet contributes substantially to riding comfort.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. An article of manufacture comprising a preformed pad for use in seats and the like interposed between springs, and upholstery material, comprising a relatively thick pad of loosely aggregated fibrous material, a highly flexible sheet of strong, resilient material substantially coextensive with said pad, and located between the upper and lower surfaces of said pad, and securing means secured to said sheet and extending outwardly therefrom.

2. An article of manufacture comprising a preformed pad for use in seats and the like interposed between springs, and upholstery material, comprising a relatively thick pad of loosely aggregated fibrous material, a highly flexible sheet of strong, resilient material substantially coextensive with said pad, and located between the upper and lower surfaces of said pad, and securing means in the form of strips of fabric secured to said sheet and extending outwardly therefrom beyond said pad.

EDWARD R. DETRICK.